D. SCANLAN.
DEVICE FOR CONTROLLING FLUID PRESSURE.
APPLICATION FILED MAR. 16, 1912.
1,146,526.
Patented July 13, 1915.
2 SHEETS—SHEET 1.
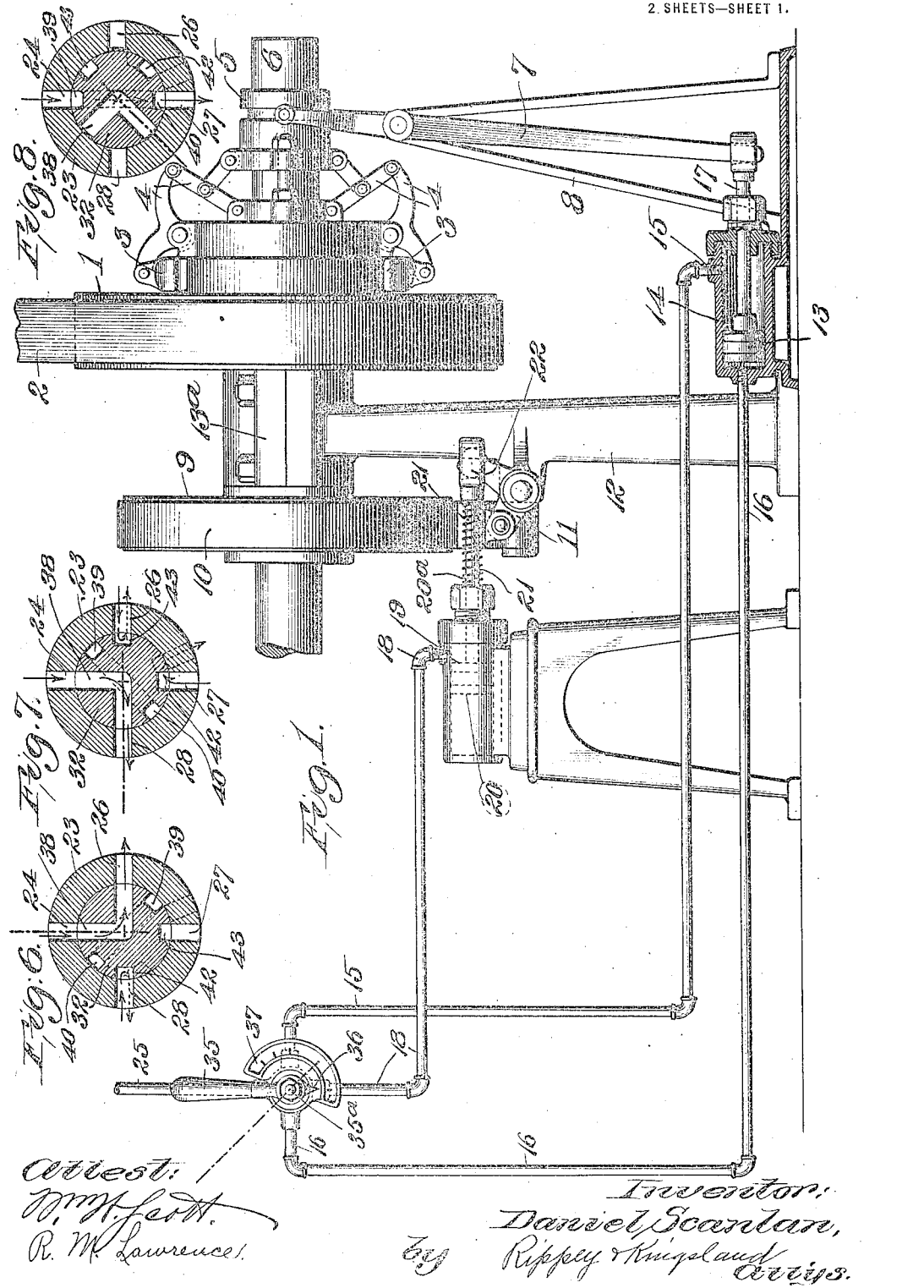

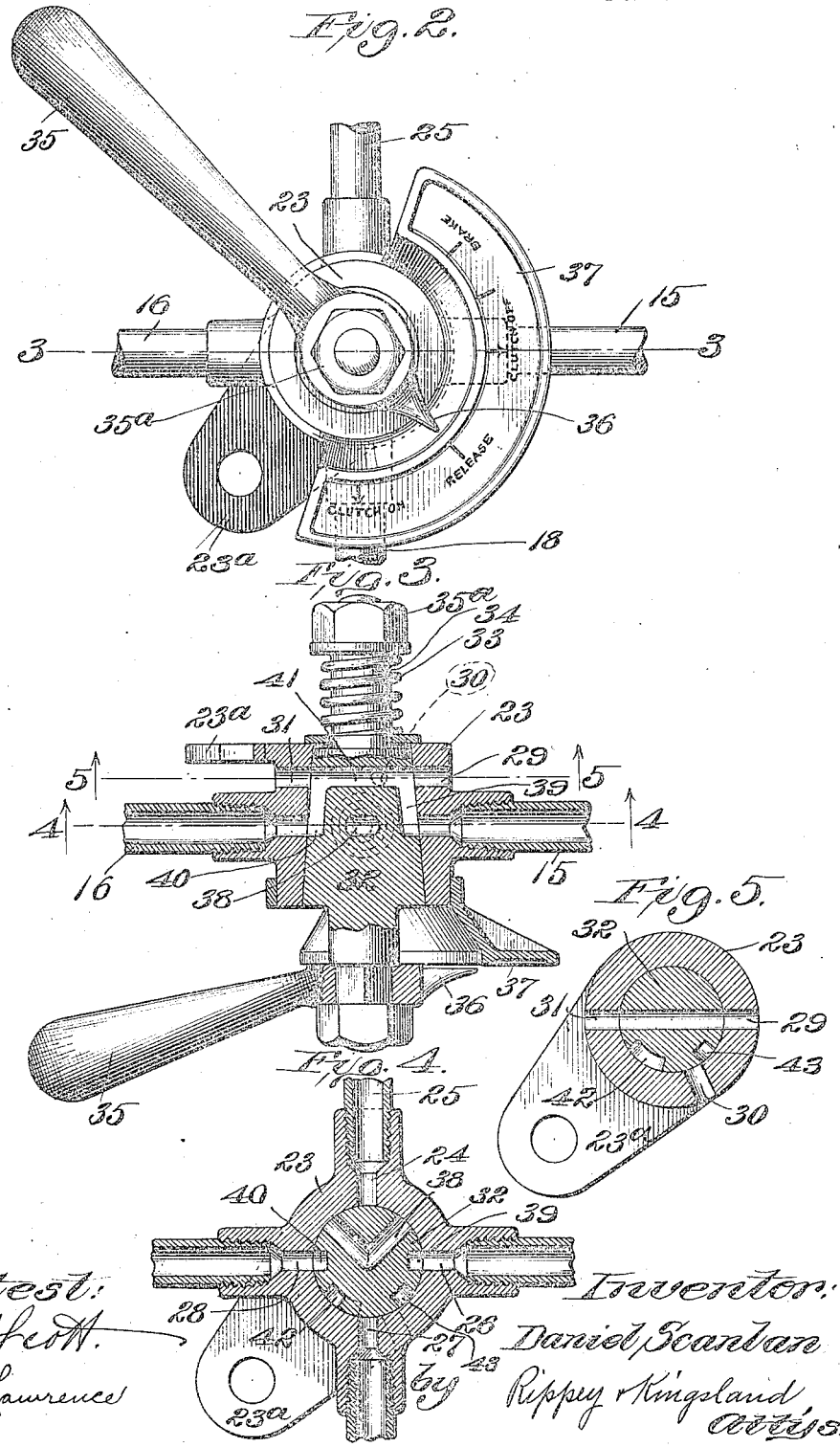

UNITED STATES PATENT OFFICE.

DANIEL SCANLAN, OF ST. LOUIS, MISSOURI, ASSIGNOR OF ONE-THIRD TO HARRY E. HARDER, OF ST. LOUIS, MISSOURI.

DEVICE FOR CONTROLLING FLUID-PRESSURE.

1,146,526.

Specification of Letters Patent.

Patented July 13, 1915.

Application filed March 16, 1912. Serial No. 684,283.

*To all whom it may concern:*

Be it known that I, DANIEL SCANLAN, a citizen of the United States, residing at the city of St. Louis and State of Missouri, have invented a new and useful Device for Controlling Fluid-Pressure, of which the following is a specification.

This invention relates to devices for controlling fluid pressure.

An object of the invention is to produce a device of the character mentioned whereby fluid for operating a plurality of fluid motors installed in a single system may be conveniently and efficiently controlled, so that the motors may be conjointly operated.

Another object of the present invention is to produce a distributing or directing device whereby fluid pressure entering the device may be distributed or directed through a plurality of outlet passages in a predetermined or selected manner for the performance of desired functions.

To these and other obvious ends I have designed and arranged the mechanism hereinafter described and illustrated in the drawings, and the essential elements and features of which are embraced within the scope of the appended claims.

In the drawing in which like characters of reference indicate like parts throughout the several views—Figure 1 is an illustration of one practical embodiment of my invention showing the relative arrangement of my mechanism and two fluid motors which are arranged to actuate mechanism for operating a clutch mechanism whereby a power shaft may be thrown into and out of operative adjustment with a driven wheel, and also for operating a band brake mechanism for controlling the driven shaft. Fig. 2 is a front elevation of the controlling device or valve. Fig. 3 is a transverse sectional view on the line 3—3 of Fig. 2. Fig. 4 is a vertical sectional view on the line 4—4 of Fig. 3, the valve plug being shown in such adjustment that the admission of fluid pressure is cut off, and the exhaust ports for the fluid passages are open. Fig. 5 is a transverse sectional view on the line 5—5 of Fig. 3 showing the exhaust ports open. Figs. 6, 7 and 8, are diagrammatic views showing the different relative adjustments of the ports, which will be more fully explained hereinafter.

In the embodiment of my invention illustrated in the drawings, I have shown my device arranged to control fluid pressure for operating two fluid operated motors, which by suitable mechanical connections are adapted to operate a clutch mechanism for throwing a driven wheel into and out of engagement with a power shaft, and for controlling a brake mechanism for said shaft. It is readily apparent that numerous adaptations of the principle of the invention may be made.

Referring to the drawings, 1 indicates a drive pulley driven by suitable belt connection 2 from any convenient source of power.

3 indicates a clutch element controlled by toggle links 4, pivoted to a slidable collar 5, mounted on the shaft 6 to throw said shaft 6 into and out of operative engagement with the drive pulley 1, as the collar 5 is operated by the lever 7 pivoted to the frame or standard 8 as will be readily understood. A band wheel 9 secured to the shaft 6, coöperates with a band 10 to constitute a band brake for releasing and locking the shaft 6, as the band 10 is slackened or tightened by operation of the bell crank lever 11 pivoted to a support 12, which support is provided with a journal bearing 13ª in which the shaft 6 is journaled.

The lever 7 is thrown to and fro to operate the clutch mechanism by means of a reciprocating piston 13 operatively mounted in the cylinder 14, said piston being actuated by the introduction of fluid pressure through the passages 15 and 16. It will be understood that when the fluid pressure is introduced to the cylinder 14, through the passage 15, and the pressure released in the passage 16, that the piston will be driven to the position shown in Fig. 1 of the drawings, effectively to throw the lever 7, which is pivoted to the piston rod 17 and thereby the collar 5 pivoted to the upper end of the lever 7 to the right, thereby setting the clutch. It will also be apparent that when the pressure in the passage 15 is released and the pressure in the passage 16 is on, the piston will be driven to the opposite end of the cylinder, effectively to swing the lever to the left, thereby releasing the clutch mechanism. After the clutch has been disengaged the momentum of the driven shaft will cause it to continue to revolve, but in certain mechanisms it is desirable that the driven shaft be brought to an immediate stop after the clutch has been released. This is accomplished in the embodiment shown by applying pressure through the passage 18 to the cylinder 19 in which is operatively mounted a piston 20 carrying a piston rod 21 which is pivoted to one arm of a bell crank lever at 22, which has secured to the other arm thereof one end of the band 10. It will be apparent that as the piston 19 is driven to the left the band 10 will be tightened about the wheel 9, thereby stopping the rotation of the shaft 6. When pressure in the cylinder 19 is released the piston rod 20 is returned to the position shown in Fig. 1 of the drawing, by the expansion spring 20ª encircling the rod 20, thereby releasing the band brake, as will be readily understood.

The device for controlling the fluid pressure through the several passages 15, 16 and 18 which constitutes the essential feature of my present invention comprises a valve case 23, which is provided with a suitable bracket 23ª for mounting the device on any suitable permanent support. Fluid pressure enters the valve case 23, through the inlet port 24, which communicates with the supply pipe or passage 25 leading from any suitable source of supply. A series of outlet ports 26, 27 and 28 communicate with the passages 15, 18 and 16, respectively; said outlet ports being cut through the wall of the case 23 at intervals of ninety degrees, and in circumferential alinement with the inlet port 24. A second series of exhaust ports 29, 30, and 31 are cut through the wall of the case 23 rearwardly of the above mentioned series of ports; said ports 29, 30 and 31 being also in circumferential alinement, and ports 29 and 31 being in horizontal alinement with the ports 26 and 28.

A conical valve plug 32 is operatively mounted in a suitable recess in the valve case 23, and held in adjustment by a coil spring 33 encircling a stud 34 formed on the plug 32; the tension of said spring 33 being adjusted by a nut 35ª in the manner well understood. The valve plug 32 is provided with a handle 35 for manual operation, which handle is provided with a pointer or indicator 36, which coöperates with a dial 37 mounted on the front face of the case 23, to indicate the position of the valve plug 32. The valve plug 32 is provided with an angular passage 38, each leg of which radiates from the center of the plug to the periphery, the centers of the openings of the passage being ninety degrees apart. This arrangement of the passage 38, when the openings thereof are brought into registration with the ports 24 and 26, as shown in Fig. 6, provides for direct communication between the inlet passage 25 and the passage 15 and permits a free passage of fluid therethrough, thereby forcing the piston 14 to the position shown in Fig. 1, which operation sets the clutch mechanism. When the openings of the passage 38 are brought into registration with the ports 24 and 28, as indicated in Fig. 7 there will be a direct passage of the fluid from the supply passage 25 through the ports 24 and 28, to the pipe 16; the pipe 16 entering the cylinder 13 at the opposite end from the pipe 15, the piston will be driven to the opposite end of the cylinder from the position shown in Fig. 1, thereby releasing the clutch mechanism, the release of pressure in the passage 15 being controlled in the manner hereinafter described. The valve plug 32 is also provided with oppositely disposed recesses 39 and 40 in its periphery, which recesses cut away a portion of the said valve plug 32 beginning at a point approximately midway of its depth, extending rearwardly and communicate with a transverse bore or passage 41. When the valve plug 32 is in the position indicated in Fig. 8, the forward end of the recess 39 registers with inlet port 24 and the forward end of the recess 40 registers with the port 27, therefore pressure from the supply pipe 25, will be conducted through the valve plug 32 and into the passage 18, via the U shaped passage, comprising the recess 39, the passage 41, and the recess 40. The said U shaped passage also constitutes an exhaust passage for the passages 15 and 16, when the passage 41 is brought into registration with the ports 29 and 31, at which time the forward ends of the recesses 39 and 40 are in registration with the ports 26 and 28. This position is the release or normal position and is so indicated on the dial 37, and is the adjustment of the parts illustrated in Figs. 2, 3, 4 and 5.

The valve plug 32 is provided with another L shaped recess 42 the forward end of which is oppositely disposed to one leg of the angular passage 38 and extending rearwardly to and terminating in the same vertical plane as the passage 41. When the passages 25 and 15 are in communication by means of the passage 38 (Fig. 6) the passage 16 is connected with the atmosphere or open adjustment as the forward end of the recess 42 registers with port 28 and the rearward end of the recess 42 communicates with the exhaust port 31, and when the clutch is thrown off (Fig. 7) the passage 18 is open, as the forward end of the recess 42 is in registration with the port 27, and the other end of said recess 42 is in registration with the exhaust port 39.

The valve plug 32 is provided with a fourth recess 43 oppositely disposed from the one leg of the angular passage 38 and provides communication between the passage 15 and the exhaust port 29 when pressure is introduced into the passage 16 (Fig. 7).

The operation of my device may be readily understood by considering the various functions it performs. Starting with the normal or release adjustment, and assuming that the valve has previously been thrown to "clutch on" position, the piston 14 will be in the position shown in Fig. 1. Now as the valve is brought to the "release" position the passage 15 will be opened as the recess 39 provides communication between the port 26, and the exhaust port 29, and the pressure previously introduced in the passage 15 will be released, but the piston 14 and parts operated thereby will remain in the position shown in Fig. 1 and the shaft will continue to be driven by the wheel 1 as there has been no pressure applied through the passage 16, to drive the piston to the opposite end of the cylinder 14. When it is desired to throw out the clutch the handle is turned to the left to "clutch off" position, the passage 15 remaining open as the port 26 is in registration with the forward end of the recess 43 and the other end of the recess registers with the exhaust port 29; the passage 18 will also be open, but this fact is now immaterial as there has been no previous pressure introduced in the cylinder 19, and the band brake 10 is off, the lever 22 being held in the position shown in Fig. 1 by the spring 20ª. Pressure will now enter the port 24, and be conducted via the passage 38 through the port 28, thence to the left end of the cylinder 14 (Fig. 1), through the passage 16, thereby driving the piston 14 to the right, throwing off the clutch. By continuing the movement of the handle to the left, the valve is brought to the "brake" position (Fig. 8). The three exhaust ports 29, 30 and 31 are now closed. In this position of the valve, pressure is admitted from the supply pipe through the port 24, via the passage comprising the recess 39, passage 41, recess 40 and port 27, to the passage 18, thence it is conducted to the right end of the cylinder 18, driving the piston to the left, applying the band brake. The handle is now returned to release or normal position, and as it is moved the valve passes through an arc of ninety degrees, and the port 27 will have been brought into registration with one end of the L shaped recess 42 while the other end of said recess will have registered with the exhaust port 30, releasing the pressure in the passage 18. When the valve again reaches the release position, the pressure in the passage 16 will be released through the passage, comprising the recess 40, and exhaust port 31. The continued movement of the handle to position indicated in Fig. 6 establishes communication between supply passage 25 and the passage 15 through the ports 24 and 26 when the openings of the passage 38 are brought into registration therewith, again setting the clutch. The passage 16 in this adjustment is open, as communication is established between the exhaust port 31 and port 28 by the recess passage 42 in the valve plug 32.

Any suitable operating fluid pressure may be used. Either aeriform fluid or liquid may be employed to supply the necessary pressure. In practice compressed air has been found eminently satisfactory.

I am aware that numerous adaptations of my invention may be made, and that changes in details of construction may be indulged in, without departure from the spirit and scope of my invention. I do not limit myself therefore, to exact details, nor to specific embodiments, but

What I claim and desire to secure by Letters Patent is—

1. A device of the character described comprising a case, provided with a supply passage, a plurality of outlet passages, and exhaust ports, a valve plug operatively mounted in said case, said valve plug being provided with an angular passage therethrough arranged to establish communication between said supply passage and different selected ones of said outlet passages, said valve plug being also provided with a longitudinal recess arranged in its periphery in such a manner as to establish communication between said exhaust ports and said outlet passages at proper times, and means for operating said valve plug, substantially as specified.

2. The combination with a cylinder, a piston in said cylinder, a second cylinder and a piston in said second cylinder, of a valve-case, a pressure-supply passage opening into said case, two passages from said valve-case to opposite ends of said first named cylinder, a passage from said valve-case to one end of said second named cylinder, an outlet passage from said valve-case, a valve mounted in said valve-case, means for operating said valve, a passage in said valve arranged to connect said pressure passage with one of said two passages in one position of said valve and arranged to connect said pressure passage with the other of said two passages in another position of said valve, an exhaust passage in said valve arranged to connect the first one of said two passages with said outlet passage when said valve is intermediate of said two positions, a passage in said valve arranged to connect said pressure passage with the passage to said second named cylinder in another position of said valve, and passages controlled by said valve for releasing the pressure from the second of said two passages and from the passage to said second cylinder, simultaneously, substantially as described.

3. The combination with a cylinder, a piston in said cylinder, a second cylinder and a piston in said second cylinder, of a valve-case, a pressure-supply passage opening into said case, two passages from said valve-case to opposite ends of said first cylinder, a passage from said valve-case to one end of said second named cylinder, exhaust ports from said valve-case, a valve-plug operatively mounted in said case, said valve-plug being provided with a passage therethrough arranged to establish communication between said pressure-supply passage and said passages leading to said first-named cylinder, said valve-plug being also provided with passages arranged to establish communication between said exhaust ports and the passages leading to said cylinders, and means for indicating the position of said valve-plug, substantially as specified.

4. The combination with a cylinder, a piston in said cylinder, a second cylinder and a piston in said second cylinder, of a valve case, a pressure supply passage opening into said valve case, passages leading from said valve case to opposite ends of said first-named cylinder, a passage from said valve case to one end of said second-named cylinder, exhaust ports from said valve case, a valve plug operatively mounted in said case, a passage in said valve adapted to establish communication between said pressure supply passage and the passages leading to said first-named cylinder, and a second passage in said valve plug arranged to establish communication between said pressure supply passage and the passage to said second-named cylinder and additional passages establishing communication between said exhaust ports and the passages leading to said cylinders, and means for operating said valve plug, substantially as specified.

5. A valve comprising a case, a pressure supply passage opening into said case, a plurality of outlet passages from said case, exhaust passages in said case opening to the atmosphere, a valve plug operatively mounted in said case, a passage in said valve adapted to establish communication between the pressure supply passage and certain ones of said outlet passages leading from said valve case, a second passage in said valve plug arranged to establish communication between said pressure supply passage and another of said outlet passages leading from said case and additional passages in said valve plug establishing communication between certain of said outlet passages and said exhaust passages, substantially as specified.

6. A valve comprising a valve case, a pressure supply passage opening into said valve case, three outlet passages from said valve case, exhaust passages from said valve case, and a valve plug operatively mounted in said case, said valve plug being provided with a passage arranged to establish communication between said pressure supply passage and two of the outlet passages leading from said valve case and also provided with passages arranged to establish communication between the exhaust passages and the outlet passages, substantially as specified.

In witness whereof, I have signed this specification in the presence of two subscribing witnesses.

DANIEL SCANLAN.

Witnesses:
J. D. RIPPEY,
L. C. KINGSLAND.